United States Patent
Bae et al.

(10) Patent No.: US 8,137,827 B2
(45) Date of Patent: Mar. 20, 2012

(54) VISUALIZATION APPARATUS FOR TRANSPARENT PEMFC

(75) Inventors: Joongmyeon Bae, Daejeon (KR); Dong-ryul Lee, Hwaseong-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 12/917,822

(22) Filed: Nov. 2, 2010

(65) Prior Publication Data

US 2011/0104524 A1    May 5, 2011

(30) Foreign Application Priority Data

Nov. 4, 2009    (KR) ................ 10-2009-0105719

(51) Int. Cl.
- *H01M 14/00* (2006.01)
- *H01M 2/08* (2006.01)
- *H01M 2/14* (2006.01)
- *H01M 4/64* (2006.01)

(52) U.S. Cl. ............ 429/8; 429/507; 429/508; 429/511; 429/517

(58) Field of Classification Search ............... 429/8, 507, 429/508, 511, 517
See application file for complete search history.

(56) References Cited

U.S. PATENT DOCUMENTS

2006/0127729 A1 *    6/2006    Roscoe et al. ................. 429/34

OTHER PUBLICATIONS

Shimoi et al., Visualization of the Membrane Temperature Field of a Polymer Electrolyte Fuel Cell, ASME, 126, Dec. 2004, p. 258.*
Shimoi et al., Visualization of the Membrane Temperature Field of a Polymer Electrolyte Fuel Cell, Dec. 2004, ASME, vol. 126, p. 258.*

* cited by examiner

*Primary Examiner* — Helen O Conley
(74) *Attorney, Agent, or Firm* — The Webb Law Firm

(57) ABSTRACT

Provided is a visualization apparatus for a transparent PEMFC using a transparent window having conditions approximating a real PEMFC. More specifically, the present invention improves a fixing frame in consideration of the distribution of pressure applied by the fixing frame, such that the visualization apparatus for a transparent PEMFC has operating conditions approximating the real PEMFC. A visualization apparatus for a transparent PEMFC of the present invention includes: current collector plates each provided at both surfaces of a membrane electrode assembly of a fuel cell and formed with a channel in which reaction gas and products flow; transparent plates provided at an outer surface of the current collector plates; and fixing frames formed with a visualization window for observing the current collector plates and provided at the outer side of the transparent plates, wherein the visualization window is formed in at least two by dividing the single window formed by penetrating through the fixing frame by a bar.

2 Claims, 5 Drawing Sheets

[FIG. 1]
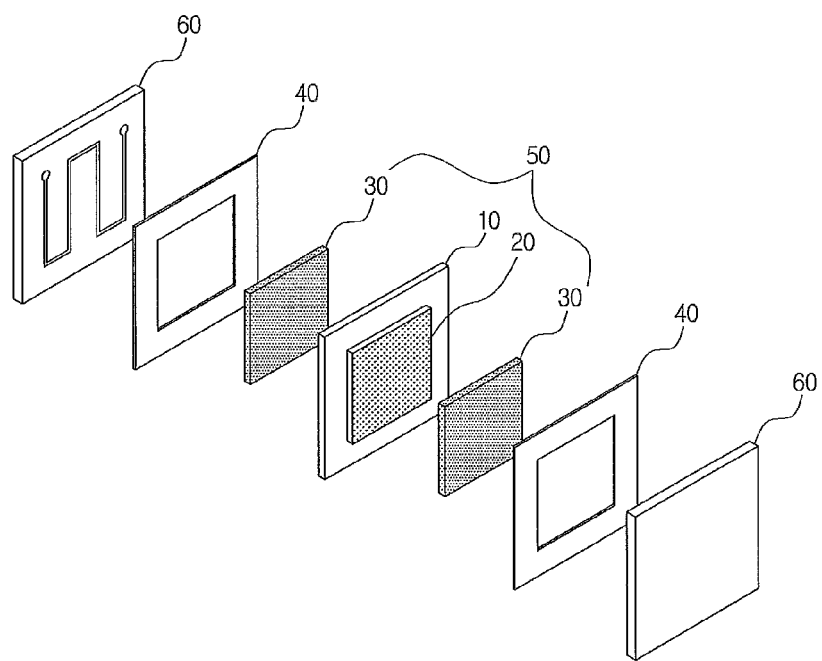

[FIG. 2]
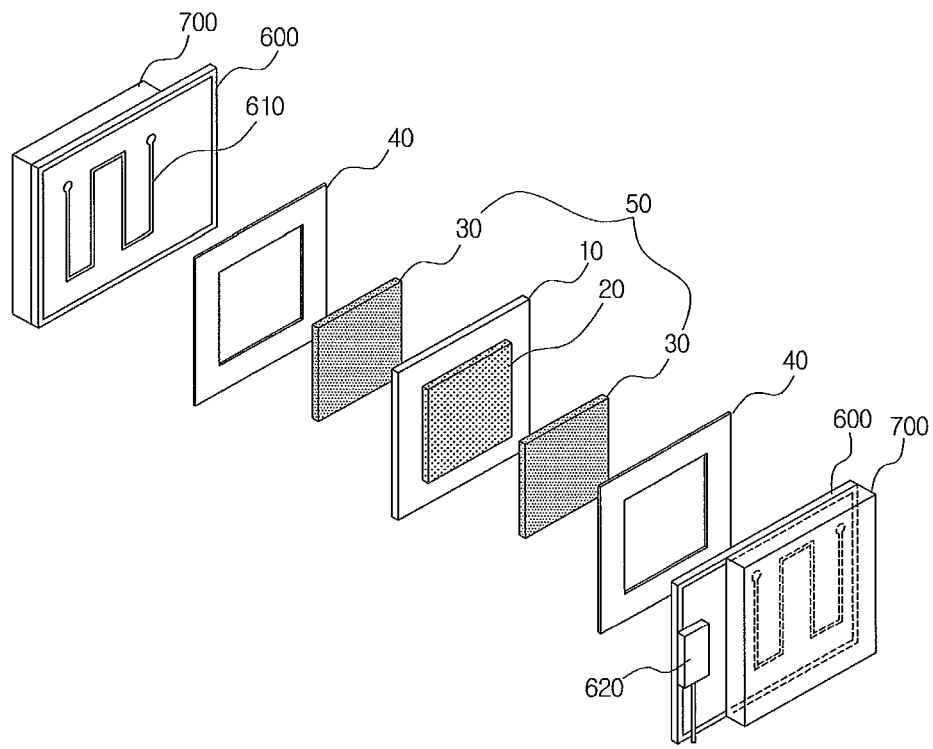
[FIG. 3]
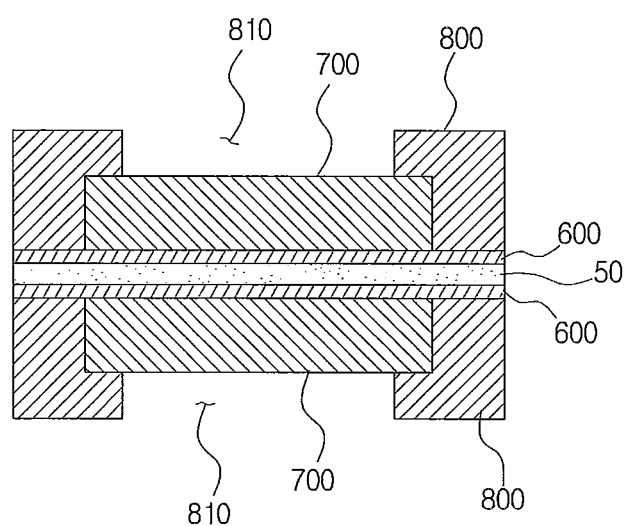

[FIG. 4]
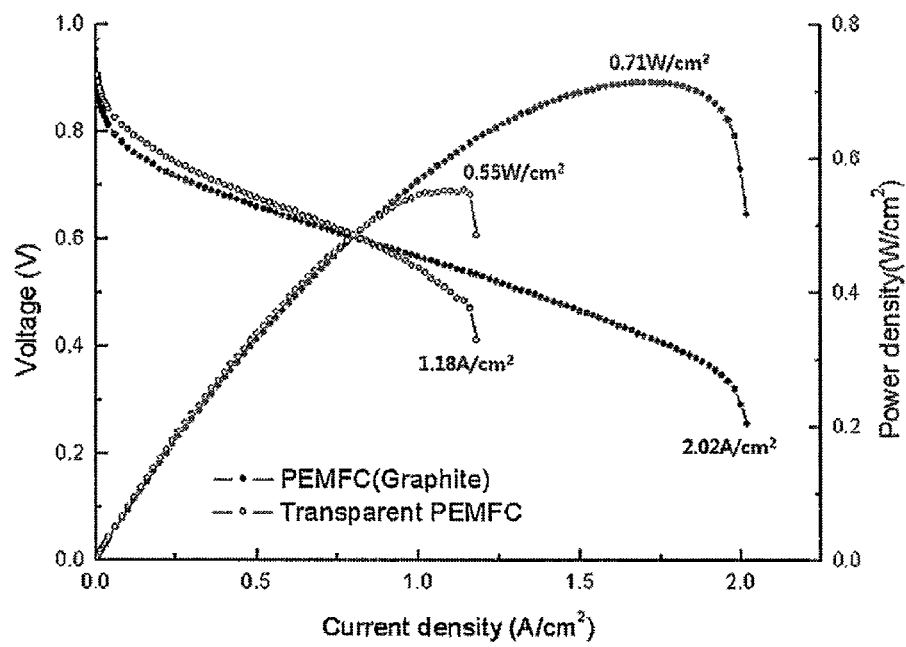

[FIG. 5]
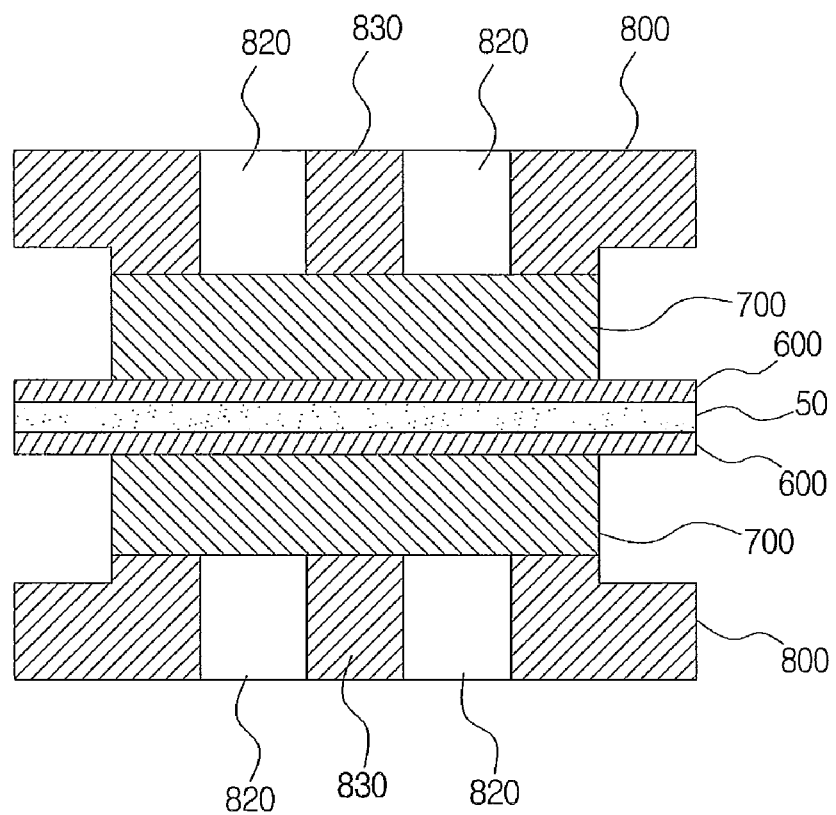

【FIG. 6】
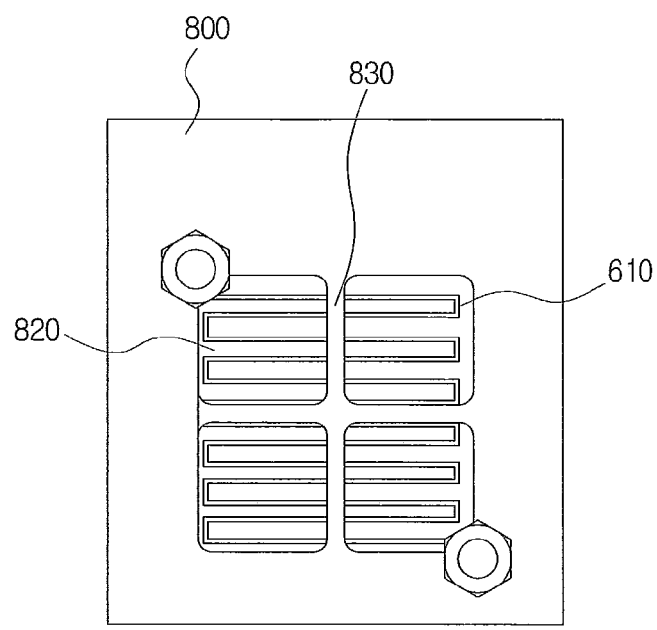
【FIG. 7】
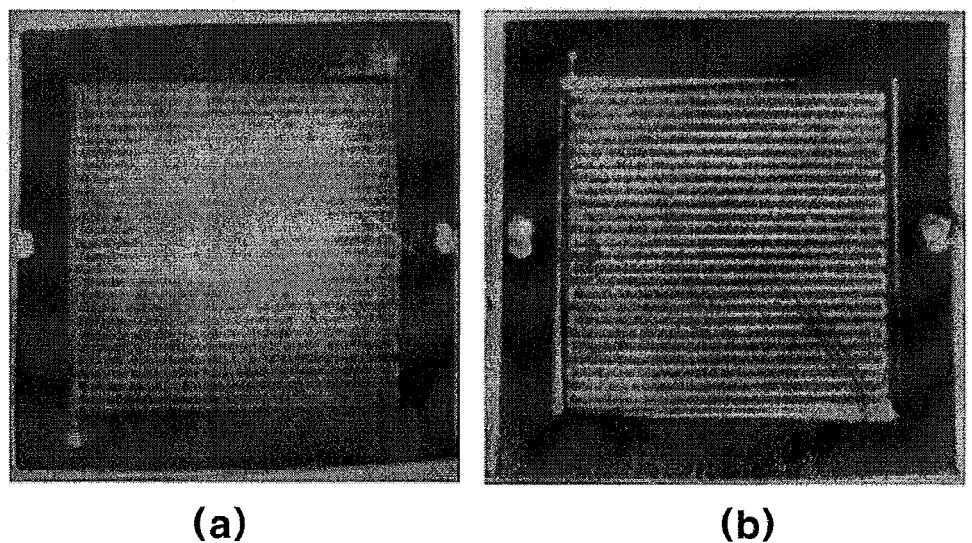
(a)　　　　　　　　　(b)

VISUALIZATION APPARATUS FOR TRANSPARENT PEMFC

TECHNICAL FIELD

The present invention relates to a visualization apparatus for a transparent PEMFC using a transparent window, and more particularly, to a visualization apparatus for a transparent PEMFC having conditions approximating a real PEMFC by improving a fixing frame mounted at the outermost side of the visualization apparatus for a transparent PEMFC and applying pressure.

BACKGROUND ART

As environmental regulations of automobile markets are increasingly tightened, the world's carmakers have tried to develop environment-friendly and high-efficient cars. It is expected that the fuel-cell car will emerge as the center focus of an automobile market in the future because it is environmentally friendly in that it only discharges water while having high efficiency. As a result, many carmakers have continued to develop a fuel-cell car. A demand for a fuel-cell technology has continuously increased in the industrial world and the academic world. Therefore, research into a fuel cell for a car, for example, a proton exchange membrane fuel cell (PEMFC), has been actively conducted.

An operating temperature of a general PEMFC shown in FIG. 1 is less than 100° C. This occurs when water is generated due to the reaction of hydrogen with oxygen, which is a liquid phase. When the liquid phase water is discharged while flowing in a fuel cell channel along with air, this is called a flooding phenomenon. The flooding phenomenon has been known as one of the main factors that degrade PEMFC performance. However, since it is difficult to visualize a two-phase flow in the PEMFC channel, research into the flooding has been mainly conducted through interpretation using a CFD.

In addition to the CFD, a method of observing the flooding by visualizing the two-phase flow in the PEMFC channel has been used. As an example, there is a method of observing the flooding in the PEMFC channel by using a neutron beam. Even though there is no need to change the components of the PEMFC in order to observe the behavior of water using the neutron beam, and reliability is at the highest, an apparatus generating the neutron beam is very expensive. In addition, it is difficult to specifically know how water is discharged since processing the image data is complex and the interface of water with air is unclear. In addition, since the image using the neutron beam is implemented in a two-dimensional plane, it is difficult to know whether or not water is presented in an anode or a cathode state.

Therefore, researchers in and outside the country have mainly used a visualization method using a transparent window. The method can directly visualize the two-phase flow within the channel, such that it can specifically observe the shape where water flows. However, unlike the real PEMFC, since a visualization apparatus using the visualization method uses a current collector plate 600 in which a passage is formed on a metal plate having a thickness of about 1 mm as shown in FIG. 2, instead of using a separator 60 shown in FIG. 1 in order to perform visualization, it has a larger possibility of distorting the two-phase flow within a channel 610, as compared to the real PEMFC. Therefore, it is very important to secure the reliability by comparing an I-V characteristic curve between the real PEMFC and the visualization apparatus.

Generally, as shown in FIGS. 2 and 3, the visualization apparatus includes transparent plates 700 at the outer sides of the current collector plates 600 and large visualization windows 810 and 820 fixed on fixing frames 800 by being pressurized to the fixing frames 800 at the outermost sides of the visualization apparatus. The visualization apparatus observes the channels 610 of the current collector plates 600 through the large visualization windows. However, the result of the experiment show that in the real PEMFC using graphite as shown in FIG. 4, a maximum current density is 0.71 W/cm$^2$, but in the visualization apparatus, a maximum current density is only 0.55 W/cm$^2$ under the same conditions. In particular, in the fuel cell, the maximum current density is 2.02 A/cm$^2$ but in the visualization apparatus, the maximum current density does not exceed 1.2 A/cm$^2$. This implies that the flow phenomenon of the visualization apparatus is different from the phenomenon shown in the real PEMFC to cause the problem in reliability.

DISCLOSURE

Technical Problem

An object of the present invention is to provide a visualization apparatus for a transparent PEMFC using a transparent window having conditions approximating a real PEMFC. In particular, the present invention grasps the influence of the distribution of pressure applied by the fixing frame mounted at the outermost side of the visualization apparatus for a transparent PEMFC on the visualization apparatus for a transparent PEMFC and improves the fixing frame such that the visualization apparatus for a transparent PEMFC has the conditions approximating the real PEMFC.

Technical Solution

In one general aspect, a visualization apparatus for a transparent PEMFC of the present invention includes: current collector plates each provided at both surfaces of a membrane electrode assembly of a fuel cell and formed with a channel in which reaction gas and products flow; transparent plates provided at an outer surface of the current collector plates; and fixing frames formed with a visualization window for observing the current collector plates and provided at the outer side of the transparent plates, wherein the visualization window is formed in at least two by dividing the single window formed by penetrating through the fixing frame by a bar.

The area of the visualization window may be 1 cm$^2$ or more.

ADVANTAGEOUS EFFECTS

According to the present invention, the visualization apparatus for a transparent PEMFC makes the distribution of pressure applied by the fixing frame uniform to form the conditions having the pressure distribution approximating the real PEMFC, thereby making it possible to increase the reliability of the visualization apparatus.

In addition, the present invention can maximally secure the size of the area that can be observed by the visualization window while achieving the uniform and sufficient surface pressure distribution.

DESCRIPTION OF DRAWINGS

The above and other objects, features and advantages of the present invention will become apparent from the following description of preferred embodiments given in conjunction with the accompanying drawings, in which:

FIG. 1 is an exploded view of a real PEMFC;

FIG. 2 is an exploded view of a visualization apparatus for a transparent PEMFC according to the related art;

FIG. 3 is a cross-sectional view of the visualization apparatus of FIG. 2 mounted with a fixing frame;

FIG. 4 is a comparison graph of an I-V characteristic curve between the visualization apparatus of FIG. 3 and the real PEMFC;

FIG. 5 is a cross-sectional view of a visualization apparatus for a transparent PEMFC mounted with a fixing frame according to the present invention;

FIG. 6 is a shape of the fixing frame of FIG. 5; and

FIG. 7 shows results of testing a surface pressure of a current collector plate of the visualization apparatus for a transparent PEMFC shown in FIGS. 3 and 5.

DETAILED DESCRIPTION OF MAIN ELEMENTS

10: Polymer electrolyte membrane
20: Catalyst layer
30: Gas diffusion layer
40: Gasket
50: Membrane electrode assembly
60: Separator
600: Current collector plate
610: Channel
620: Heater
700: Transparent plate
800: Fixing frame
810: Single window
820: Visualization window
830: Bar

BEST MODE

Hereinafter, a visualization apparatus for a transparent PEMFC according to the present invention will be described in detail with reference to the accompanying drawings.

FIG. 3 is a cross-sectional view of a visualization apparatus for a transparent PEMFC mounted with a fixing frame 800 according to the related art and FIG. 4 is a graph comparing an I-V characteristic curve between the visualization apparatus of FIG. 3 and a real PEMFC.

FIG. 5 is a cross-sectional view of a visualization apparatus for a transparent PEMFC mounted with the fixing frame 800 according to the present invention and FIG. 6 shows a shape of the fixing frame 800 of FIG. 5. FIG. 7 shows results of testing a surface pressure of a current collector plate 600 of the visualization apparatus for a transparent PEMFC shown in FIGS. 3 and 5.

As shown in FIGS. 3 and 5, the visualization apparatus for a transparent PEMFC includes current collector plates 600 formed with channels 610 in which reaction gas and products flow, instead of a separator 60 provided at both surfaces of a membrane electrode assembly 50 of a fuel cell that includes a polymer electrolyte membrane 10, a catalyst layer 20, and a gas diffusing layer 30, having a gasket 40 between both surfaces thereof unlike the real PEMFC, transparent plates 700 provided at the outer surfaces of the current collector plates 600, and fixing frames 800 having visualization windows 820 for observing the current collector plates 600 formed thereon and provided at the outer sides of the transparent plates 700.

The current collector plate 600 is composed of a metal plate having a thickness of about 1 mm and is provided with the channel 610 corresponding to a passage for reaction gas and products. The passage of the current collector plate 600 is visually observed through the visualization apparatus for a transparent PEMFC.

The transparent plate 700 is configured to cover the outer surface of the current collector plate 600 and is made of a transparent material (polycarbonate, or the like) in order to observe a two-phase flow within the channel 610.

The fixing frames 800 are provided at both the outermost sides of the visualization apparatus and are pressurized, such that the components of the visualization apparatus for a transparent PEMFC according to the present invention are assembled to be closely attached to each other. Meanwhile, the fixing frames 800 are provided with a visualization window 820 formed by penetrating through the central portion in order to observe the passage through the transparent plate 700.

According to the related art, in the visualization apparatus including the above-mentioned components, the wide single window 810 is manufactured in a quadrangular shape at the central portion of the visualization window of the fixing frame 800 so that the visualization window 820 can occupy a large area as maximally as possible, thereby making it possible to observe the two-phase flow of the channel 610 through the transparent plate 700 under the visualization window 820. Comparing the I-V characteristic curve between In the case of the visualization apparatus having the fixing frame 800 according to the related art having the above-mentioned components and the real PEMFC having the real separator 60, it can be appreciated from FIG. 3 that the visualization apparatus is remarkably different from the real PEMFC, which makes the flow within the visualization apparatus according to the present invention different from the real PEMFC, thereby deteriorating the reliability of the visualization apparatus.

As a result of analyzing the difference, the present invention finds the problem of the fixing frame 800 having the visualization window 820 and provides the visualization apparatus with the improved fixing frame 800.

As shown in FIG. 6, the fixing frame 800 of the visualization apparatus for a transparent PEMFC according to the present invention is provided with the visualization window 820 for observing the current collector plate 600 and is provided at the outer side of the transparent plate 700. In particular, the visualization window 820 is formed in at east two by dividing the single window 810 formed by penetrating through the fixing frame 800 by a bar 830.

The fixing frame 800 of the visualization apparatus for a transparent PEMFC according to the present invention is provided with the bar 830 in a lattice structure crossing the central single window 810 The window 830 may be a separate member, but the present invention forms holes forming the visualization window 820 at a predetermined interval in forming the visualization window 820 on the fixing frame 800, such that the fixing frame 800 corresponding to the interval forms the bar 830. The bar 830 is to improve a problem in that the pressure is not applied to a portion of the single window 810 upon assembling in the related art while the fixing frame 800 pressurizes the internal components under the transparent plate 700. As a result, the internal components under the transparent plate 700 is pressurized by the bar 830 and the pressure is uniformly distributed and pressurized.

This can be appreciated from FIG. 7. The left of FIG. 7 shows results of testing a surface pressure applied to an assembled current collector plate in the case the fixing frame 800 having the single window 810 as the visualization window 820 in the relate art and the right thereof shows results of testing a surface pressure applied to the assembled current collector plate in the case of the fixing frame 800 having the improved visualization window 820 according to the present invention. In the case of the left of FIG. 7, since an edge portion of the fixing frame 800 is fixed by a bolt, or the like, the central portion of the fixing frame 800 is not properly applied with pressure or is non-uniformly applied with pressure, or the like. As a result, the current collector plate 600 and the membrane electrode assembly 50 do not contact each other by a uniform pressure. In particular, it can be appreciated that the surface pressure is not sufficient to discriminate the channel 610 (groove) and the rib (between grooves) at the outside of the channel 610 and is non-uniform.

However, in the case of the right of FIG. 7, it can be appreciated that the surface pressure is relatively sufficient and is relatively applied uniformly, as compared to the left of FIG. 7. The size and distribution of the surface pressure leads to the difference in flow between the real PEMFC and the visualization apparatus.

In the visualization apparatus for a transparent PEMFC according to the present invention, the bar 830 is formed in a lattice structure in order for the fixing frame 800 to uniformly apply the surface pressure. The single window 810 is divided into the plurality of visualization windows 820 through the window 830 in a lattice structure. In this case, it is preferable to uniformly distribute an empty area in which pressure is not directly applied to the current collector plate by the visualization window. For example, it is preferable that the visualization windows are formed to be symmetrical to each other, based on the central portion of the current collector plate as an original point. In the present invention, an example in which four visualization windows are symmetrical to each other based on the central portion by one lattice and a cross shape is shown.

In this case, since the area that can be minimally observed through the visualization window 820 is secured, it is preferable that the area of the visualization window 820 is 1 $cm^2$ or more.

The present invention is not limited to the embodiment described herein and it should be understood that the present invention may be modified and changed in various ways without departing from the spirit and the scope of the present invention. Therefore, it should be appreciated that the modifications and changes are included in the claims of the present invention.

The invention claimed is:

1. A visualization apparatus for a transparent PEMFC, comprising:
   current collector plates each provided at both surfaces of a membrane electrode assembly of a fuel cell and formed with a channel in which reaction gas and products flow;
   transparent plates provided at an outer surface of the current collector plates; and
   fixing frames formed with a visualization window for observing the current collector plates and provided at the outer side of the transparent plates,
   wherein the visualization window is formed in at least two by dividing the single window formed by penetrating through the fixing frame by a bar.

2. A visualization apparatus for a transparent PEMFC of claim 1, wherein the area of the visualization window is 1 $cm^2$ or more.

* * * * *